United States Patent [19]
Irwin

[11] 3,924,403
[45] Dec. 9, 1975

[54] COMBUSTION LINER SPRING SUPPORT USED FOR HOT WIRE IGNITER CIRCUIT

[75] Inventor: John A. Irwin, Indianapolis, Ind.

[73] Assignee: General Motors Corporation, Detroit, Mich.

[22] Filed: Oct. 24, 1974

[21] Appl. No.: 517,806

[52] U.S. Cl........... 60/39.32; 60/39.65; 60/39.74 R; 60/39.82 N; 431/189
[51] Int. Cl.²..... F02C 7/20; F02G 3/00; F02C 7/26
[58] Field of Search .......... 431/258, 352, 189, 258; 60/39.65, 39.74 R, 39.32, 39.82 R, 39.82 N

[56] References Cited
UNITED STATES PATENTS

| | | | |
|---|---|---|---|
| 2,287,246 | 6/1942 | Hess | 431/189 X |
| 2,339,477 | 1/1944 | Hess et al. | 431/189 |
| 2,459,286 | 1/1949 | Rabezzana et al. | 60/39.82 S |
| 2,904,108 | 9/1959 | Blaha | 431/189 X |
| 2,967,224 | 1/1961 | Irwin | 431/352 X |
| 2,990,877 | 7/1961 | Tramontini | 431/352 X |

*Primary Examiner*—C. J. Husar
*Assistant Examiner*—Thomas I. Ross
*Attorney, Agent, or Firm*—Paul Fitzpatrick

[57] ABSTRACT

A combustion liner for a gas turbine combustion apparatus is composed of a series of ceramic wall rings coaxially aligned from the upstream to the downstream end of the liner. The ceramic rings are connected so as to be free to expand radially relative to each other while maintaining alignment. One type of connection between the rings involves notches distributed around the ends of a ring and bosses distributed around the adjacent end of the next ring entering into the notches. Another type of interconnection involves notches distributed around adjacent ends of two ceramic rings with a metal ring disposed between them having bosses which engage in some of the notches to align the parts. The liner is supported by supports at the ends of the liner from an outer casing. One support includes a spring to accommodate relative expansion of the liner and outer casing. A hot wire type fuel igniter disposed around the fuel nozzle of the combustion apparatus is energized by a circuit through the compression spring with return to the grounded casing through the fuel nozzle.

3 Claims, 11 Drawing Figures

COMBUSTION LINER SPRING SUPPORT USED FOR HOT WIRE IGNITER CIRCUIT

My invention is directed to combustion apparatus of a high energy type suitable for use in gas turbines, for example, and particularly to improvements facilitating the use of ceramic combustion liners in such apparatus.

As is well known, the usual gas turbine combustion apparatus comprises a casing to which air is supplied under pressure and a combustion liner within which combustion of fuel and dilution of the combustion products takes place. In practice, such combustion liners have ordinarily been made of high temperature resisting metal alloys, and properly constructed liners have proven very satisfactory. However, ceramic materials offer a promise of serving satisfactorily as gas turbine combustion liners at a lower cost than the exotic alloys used in metal liners, and providing some other advantages over the metal.

While ceramic materials used for this purpose ordinarily have very low coefficients of thermal expansion, nevertheless the differences in temperature at various locations in a combustion liner tend to cause considerable stresses because of differential thermal expansion. Particularly, stresses are likely to be excessive, causing cracking, at points where the liner is apertured for admission of combustion or dilution air.

Also, because of the brittle nature of the ceramic and the difference of expansion between it and the metal outer casing or engine structure in which the liner is mounted, there are problems of providing a suitable mount which will accommodate differential thermal expansion and support the liner adequately without imposing localized stresses which may cause failure of the liner.

My patent application Ser. No. 460,964 for Ceramic Combustion Liner, filed Apr. 15, 1974, of common ownership with this application, discloses an arrangement for supporting coaxially a number of rings making up the wall of a ceramic combustion liner. My patent application Ser. No. 458,074 for Combustion Liner Support, filed Apr. 5, 1974 (common ownership), discloses means for supporting a combustion liner in a gas turbine engine between supports relatively yieldable axially of the liner.

The liner of my present invention is intended to provide improvements over these structures. The present invention provides an improved arrangement for ignition of the fuel sprayed into the combustion liner by a hot wire or glow wire type igniter employing resilient means for supporting the liner from the outer casing for supplying current to the igniter.

The principal object of my invention is to provide an improved fuel igniter arrangement, particularly one adapted to utilize structure employed to mount a ceramic liner resiliently in a combustion apparatus casing.

The nature of my invention and its advantages will be more clear to those skilled in the art from the succeeding detailed description of the preferred embodiment, the accompanying drawings thereof, and the appended claims.

Referring to the drawings.

Figure 1:
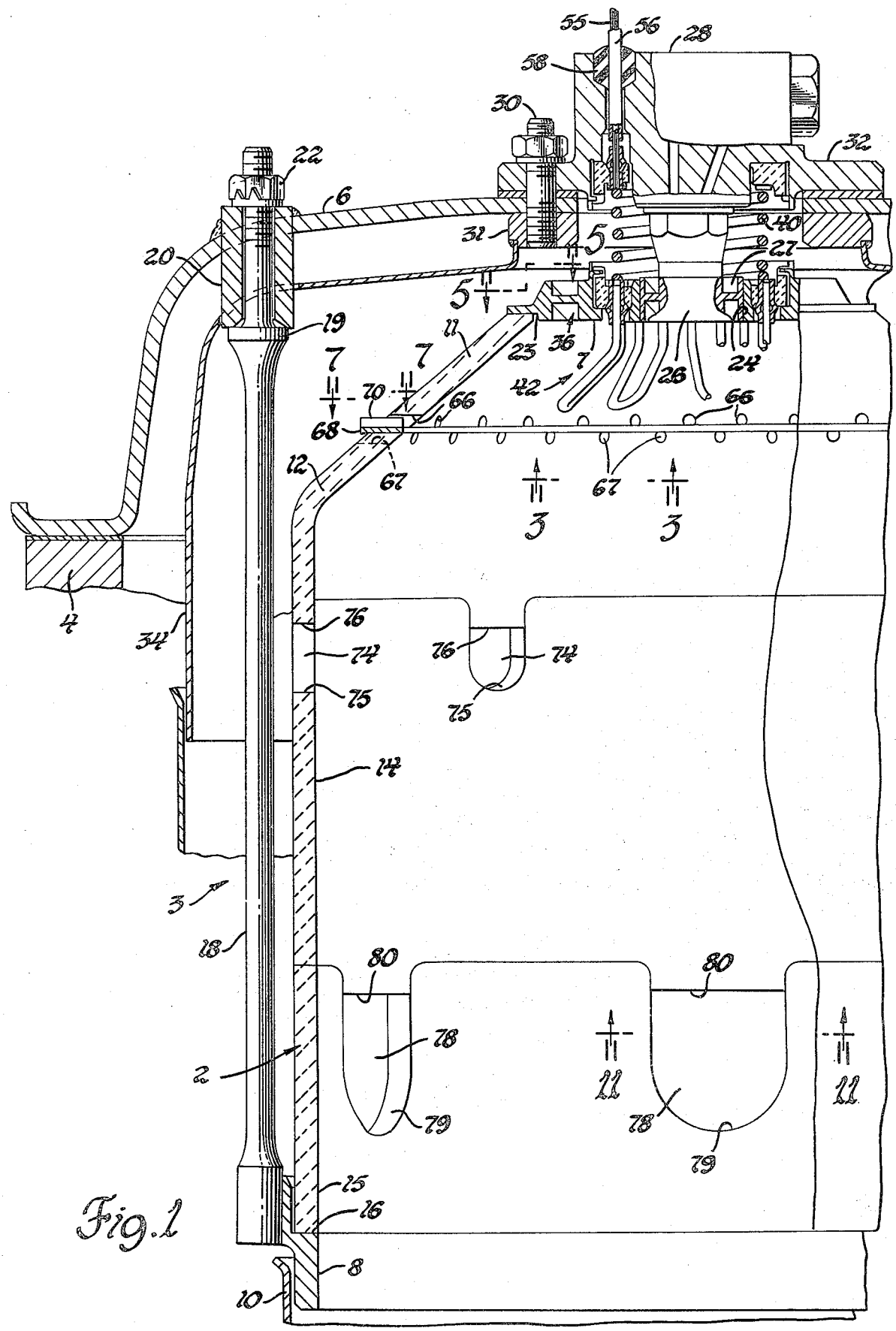
FIG. 1 is a partial longitudinal sectional view of a gas turbine combustion apparatus with parts cut away.

FIG. 1 is a view of the liner as installed in a gas turbine engine of known type which may be similar to those described in U.S. Pat. Nos. as follows: Collman et al., 3,077,074, Feb. 12, 1963; Collman et al., 3,267,674, Aug. 23, 1966; and Bell 3,490,746, Jan. 20, 1970. The combustion liner 2 is mounted in a space or a plenum 3 defined by a casing, a portion of which may be constituted by the engine frame or housing indicated at 4. The casing may be closed by a combustion cover 6 fixed by means not illustrated to the housing 4.

The combustion liner 2 as illustrated is supported from the cover 6. It extends from a support ring 7 of suitable heat-resistant metallic material to a ring-shaped outlet fitting 8 at the downstream or outlet end of the liner. Ring 8 may be piloted within a suitable duct 10 which conducts the combustion products to a user such as the turbine of a gas turbine engine.

The liner illustrated comprises four coaxial ceramic wall rings 11, 12, 14, and 15. The wall ring 11 defines part of the dome or upstream end of the liner; ring 12 defines the outer portion of the dome and the upstream end of the generally cylindrical side wall of the liner; and rings 14 and 15 complete the side wall of the liner. The downstream end of ring 15 fits within the outlet fitting 8 and abuts a shoulder 16 on that ring. The outlet ring is welded or otherwise fixed to a number of tie rods 18 (preferably three or four) distributed around the circumference of the outlet fitting which extend parallel to the axis of the liner through the cover 6. As illustrated, each tie rod 18 includes a flange 19 which bears against the face of a sleeve 20 welded to and extending through the cover 6. The flange 19 is held against the sleeve 20 by a nut 22 threaded onto the exposed end of the tie rod. The tie rods thus locate the downstream or outlet end of the liner. The support ring 7 bears against the upstream end of ring 11 and includes a pilot portion 23 fitting within a central opening in the ring 11. The pilot portion 23 thus secures alignment of the rings 11 and 7.

Support ring 7 is slidably piloted on the exterior surface 24 of a portion of a fuel spray nozzle 26. This portion of the nozzle defines an air entrance swirler 27 around the body or spray tip of the fuel nozzle. The fuel nozzle, which may be any suitable spray nozzle, is fixed to a fuel inlet fitting 28 mounted on cover 6. Three studs 30 extend from a ring 31 through the cover and a flange 32 of the fuel inlet fitting. Nuts mounted on these studs hold the fuel inlet fitting and the ring 31 clamped against opposite faces of the cover 6. A sheet metal heat shield 34 extends from the ring 31 between the liner and the cover 6 to shield the cover in large measure from the heat radiated by the liner 2. The fuel inlet fitting 28 may receive fuel through a pipe (not shown) and may house a flow divider (not shown) which directs the fuel to the spray nozzle 26. If the nozzle is air-assisted, air also enters through this fitting.

Figure 2:
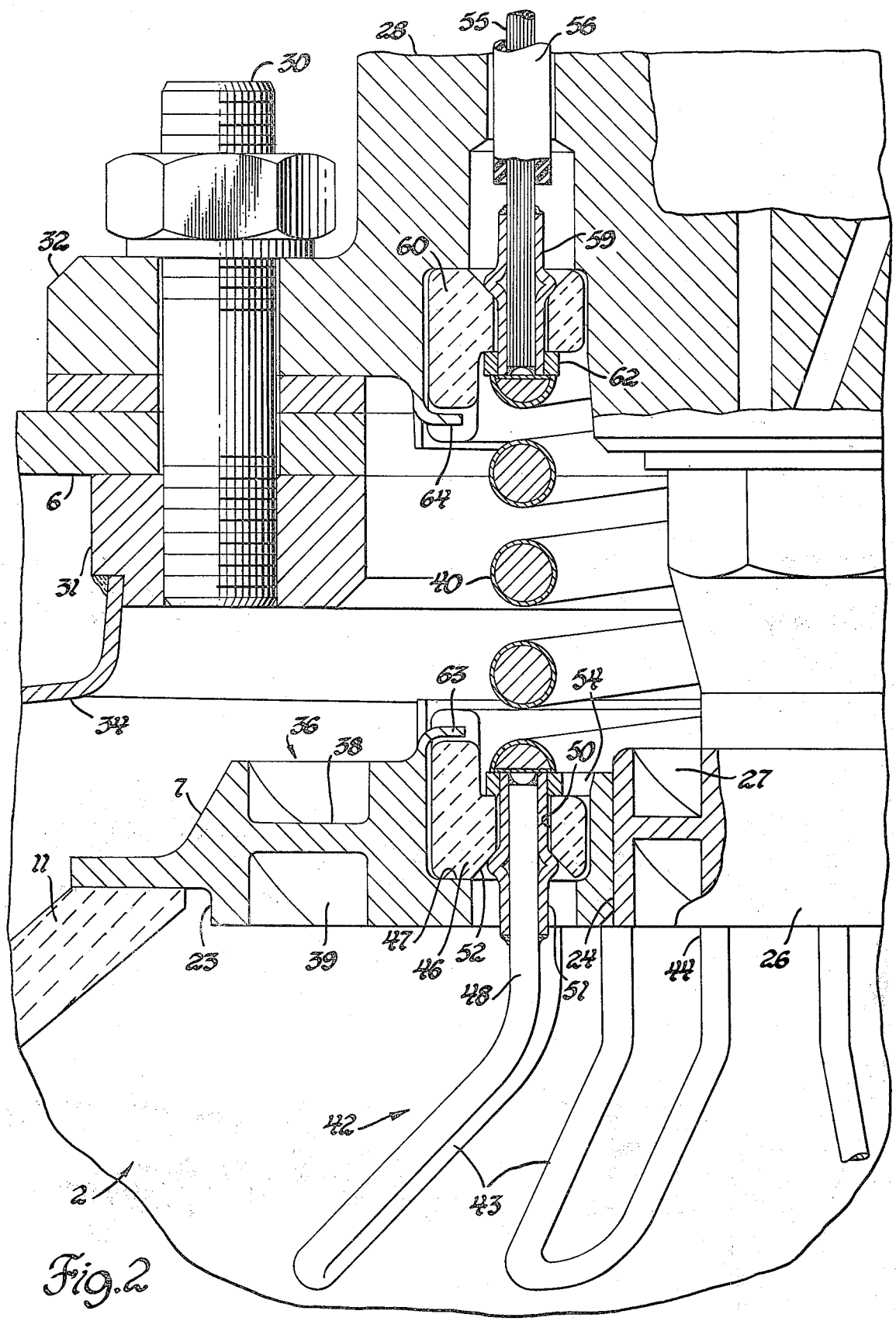
FIG. 2 is an enlarged view of a portion of FIG. 1.
Figure 3:
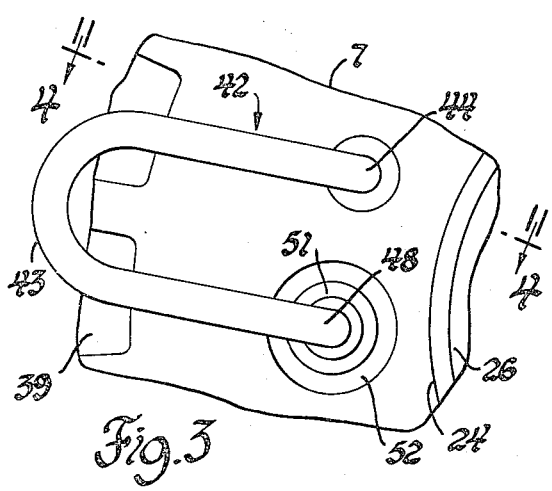
FIG. 3 is a fragmentary sectional view taken on the plane indicated by the line 3—3 in FIG. 1.
Figure 5:
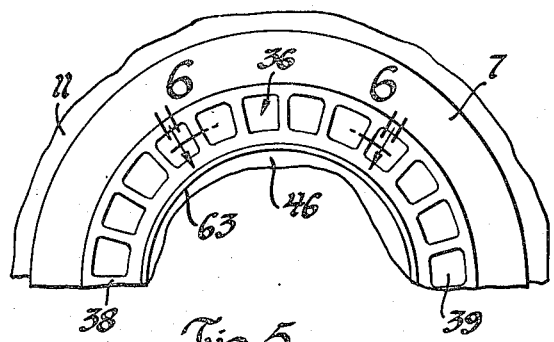
FIG. 5 is a detail sectional view taken on the plane indicated by the line 5—5 in FIG. 1.
Figure 4:
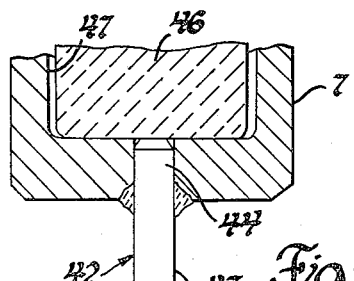
FIG. 4 is a detail sectional view taken on the plane indicated by the line 4—4 in FIG. 3.
Figure 6:
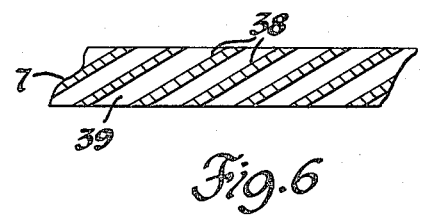
FIG. 6 is a fragmentary sectional view taken on a curved surface indicated by the line 6—6 in FIG. 5.

As illustrated also in FIGS. 2, 5, and 6 the support ring 7, which may be a casting, includes a primary air swirler 36 defined by helical vanes 38 separating air inlet ports 39.

The support ring 7 is biased toward outlet fitting 8 by a coil compression spring 40 mounted between the ring 7 and the fuel inlet fitting 28. The spring installation includes means whereby this spring conducts current to hot wire igniter means 42 similar in some respects to those of my prior U.S. Pat. No. 2,967,224 issued Jan. 31, 1961.

The igniter 42 (FIGS. 1 through 4) comprises a crown or annular array of parallel-connected wire loops 43, the loops being bent outwardly from the axis of the fuel nozzle 26 as indicated in FIGS. 1 and 2 to lie adjacent the cone of fuel spray from the nozzle. The wire is of relatively high resistance heat-resistant metal such as the alloy of Ni and Cr known as Nichrome. Eight such loops are provided in the preferred structure. Each loop 43 has one end 44 inserted in a hole in the support ring 7 and retained preferably by brazing. An annular insulator 46 disposed in an annular recess 47 in the support ring 7 overlies the ends 44 of the hot wire loops.

The other ends 48 of the loops all extend through holes 50 in the insulator 46. A sleeve 51 brazed to the end 48 of the wire is formed with a flare or ridge which bears against a countersink 52 at the inner end of hole 50. Sleeve 51 projects through the insulator 46 and is fixed by brazing in a mating hole in a conductive distributing ring 54 of metal which overlies the outer surface of insulator 46. Thus, all of the ends 48 of the hot wires are connected to the ring 54 and all of the ends 44 are connected to the ring 7, these being isolated from each other by the insulator 46. Ring 7 is grounded to the frame of the engine through the fuel nozzle 26, fitting 28, and studs 30.

Current to heat the wires 43 for ignition is supplied through the spring 40, one end of which bears against the distributing ring 54. The current is fed from a suitable source, such as the 12 volt electrical system of a motor vehicle, to spring 40 by an ignition lead 55 which extends through the fuel fitting 28. Lead 55 is covered by insulation 56 and is resiliently supported and sealed in the fitting 28 by suitable potting compound 58. Lead 55 terminates in a sleeve 59, similar to sleeve 51 already described, which extends through a hole in an annular insulator 60 lodged in an annular recess in the inner surface of fitting 28. Sleeve 59 is fixed to a conducting metallic ring 62 which provides an abutment for spring 40. Spring 40, which is of a suitable high temperature alloy, has a silver plating preferably about 1/16 millimeter thick over its entire surface to improve its contact with the rings 62 and 54 and its conductivity.

The annular insulators 46 and 60 are made of some material adapted to the temperature range involved such as silicon carbide, silicon nitride, or glass/ceramic. These rings are held in place by tabs 63 and 64, respectively, bent out of opposite sides of the margins of ring 7 and fitting 28, respectively, engaging in notches in the surface of the insulators.

The nominal diameter of the wire loops 43 is approximately 3 millimeters. The return bend portion of these wires may be electrochemically etched to a smaller diameter before plating to control the power requirement, as desired. As will be apparent, when the lead 55 is energized from a suitable current source, the wire loops 43 of the igniter are energized in parallel and are heated to a temperature sufficient to ignite the mixture of fuel from the nozzle 26 and the air entering through the various ports in support ring 7 and the liner wall.

We proceed now to a description of the structure of the liner wall shown most clearly in FIGS. 1 and 7 through 11. As outlined above, the liner wall is defined by the four coaxial ceramic rings 11, 12, 14, and 15 retained between the support ring 7 and the outlet fitting 8. The upstream end of conical ring 11 is located and centered on ring 7 by the pilot portion 23 of the ring. There is sufficient clearance between these to allow for the greater expansion of the metal ring 7 than of the ceramic ring 11.

The connection between liner wall rings 11 and 12 provides for relative radial expansion while aligning the rings and for entry of additional combustion air. This involves a set of radially extending notches 66 in the downstream edge of ring 11 and a corresponding set of radially extending notches 67 in the upstream edge of ring 12. In the preferred form illustrated, the notches at each ring are spaced 12° apart for a total of 30 notches, and the notches in each ring are disposed intermediate the notches in the other ring. However, the notches in the two rings may be aligned if desired.

Figure 9:
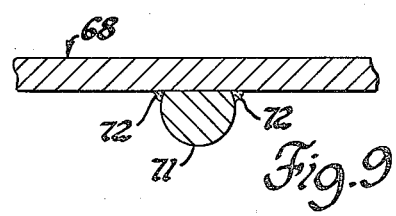
FIG. 9 is a fragmentary sectional view of a connecting ring taken on the plane indicated by the line 9—9 in FIG. 10.
Figure 7:
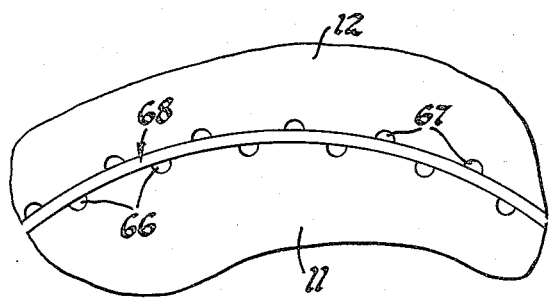
FIG. 7 is a detail view taken on the plane indicated by the line 7—7 in FIG. 1.
Figure 10:
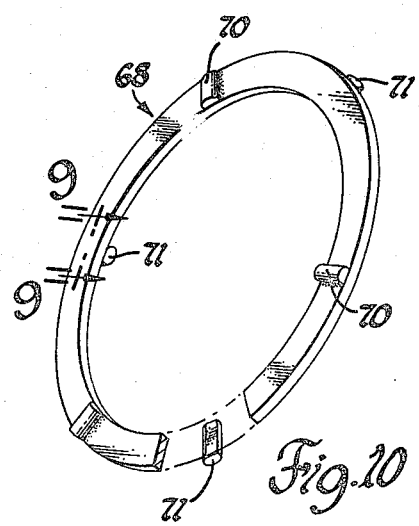
FIG. 10 is an axonometric view of the connecting ring.

A connecting ring 68 which bears against the adjacent faces of rings 11 and 12 is shown more clearly in FIGS. 9 and 10. The connecting ring 68 bears radially extending bosses or ribs 70 on its upstream surface and 71 on its downstream surface, these being distributed approximately 120° apart around the circumference and the bosses of the two sets being spaced intermediate each other. As illustrated in FIG. 9, the boss 71 is formed by a short section of rod flat on one side and welded to the ring 68 at 72. Other modes of forming the ring such as casting or deforming a flat ring to provide the bosses are possible.

Figure 8:
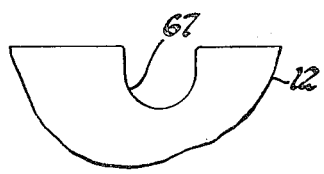
FIG. 8 is a detail view illustrating a notch in a wall ring.
Figure 11:
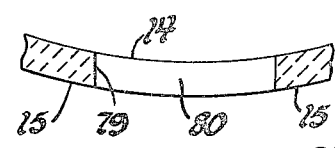
FIG. 11 is a fragmentary sectional view taken on the plane indicated by the line 11—11 in FIG. 1.

FIG. 8 illustrates more clearly the configuration of one of the notches 67 in the edge of ring 12 (or 66 in ring 11). As will be apparent, the bosses 70 and 71 center connecting ring 68 with respect to the ceramic wall rings 11 and 12 and thereby align the axes of these two rings, while allowing for relative expansion of the two ceramic parts and also of the metal ring with respect to the ceramic parts. The small ports defined by the notches 66 and 67 introduce some combustion air radially inwardly into the reaction zone of the combustion apparatus. This air serves also to cool the metal connecting ring 68.

Additional combustion air is directed towards the center of the liner through a ring of primary air ports 74, which may be of any desired number. As illustrated, there are six primary air ports 74 defined by notches 75 of substantial depth and width in the upstream edge of wall ring 14. The upstream edge of each port is defined by a boss 76 extending axially from the downstream edge of ring 12 and fitting with a small amount of clearance within the notch 75. This structure aligns the axes of the two rings 12 and 14 while allowing relative radial expansion by radial sliding of the bosses 76 in the notches 75.

The structure for introduction of dilution air and for interconnection of rings 14 and 15 is similar to that just described. The dilution air ports 78 are substantially larger than the combustion air ports 74; these preferably are staggered around the axis of the liner with respect to ports 74 as illustrated in FIG. 1. Thus there are six ports 78 as illustrated. Each port 78 is defined by a notch 79 in the upstream edge of ring 15 and a boss 80 extending from the downstream edge of ring 14, as illustrated also in FIG. 11. The side walls of notch 79 are parallel, likewise the side edges of boss 80, to promote freedom for relative radial movement of the boss within the notch.

It should be noted that the structure just described for entry of combustion air and dilution air through ports 74 and 78 provides the combustion and dilution air ports without necessity of molding closed holes in the ceramic liner wall ring. It also provides a very simple and effective structure for aligning the parts of the liner. Division of the liner into the four rings provides for accommodation of individual parts of the structure to differences in temperature, such as the very considerable difference in temperature between the rings 14 and 15, for example, without setting up undue stresses in the liner wall.

The advantages of the structure illustrated and claimed should be apparent to those skilled in the art from the foregoing detailed description.

The detailed description of the preferred embodiment of the invention for the purpose of explaining the principles thereof is not to be considered as limiting or restricting the invention, since many modifications may be made by the exercise of skill in the art.

I claim:

1. A combustion apparatus for a gas turbine engine or the like comprising, in combination, a casing adapted to receive air under pressure; a combustion liner mounted within the casing defining a reaction zone; a fuel nozzle extending from the casing into the liner; the liner including a conductive support ring disposed about the nozzle and grounded to the casing through the nozzle; means for mounting the liner within the casing including a compression spring extending from the casing to the liner around the fuel nozzle; an ignition current lead extending through the casing into contact with the spring, the lead and spring being insulated from the casing and the support ring; hot wire means for fuel ignition disposed adjacent to the fuel nozzle, the hot wire means having one end grounded to the support ring and one end insulated from the support ring and connected to the spring.

2. A combustion apparatus for a gas turbine engine or the like comprising, in combination, a casing adapted to receive air under pressure; a combustion liner mounted within the casing defining a reaction zone; a fuel nozzle extending from the casing into the liner; the liner including a conductive support ring disposed about the nozzle and grounded to the casing through the nozzle; means for mounting the liner within the casing including a compression spring extending from the casing to the liner around the fuel nozzle; a conductive distributing ring disposed around the nozzle adjacent to the support ring and insulated from the support ring; means including the spring for conducting ignition current to the distributing ring; and a crown of rebent hot wires for fuel ignition disposed adjacent to the fuel nozzle, each hot wire having one end grounded to the support ring and one end insulated from the support ring and connected to the distributing ring.

3. A combustion apparatus for a gas turbine engine or the like comprising, in combination, a casing adapted to receive air under pressure; a combustion liner mounted within the casing defining a reaction zone; a fuel nozzle extending from the casing into the liner; the liner including a conductive support ring disposed about the nozzle and grounded to the casing through the nozzle; means for mounting the liner within the casing including a compression spring extending from the casing to the liner around the fuel nozzle; an ignition current lead extending through the casing into contact with the spring, the lead and spring being insulated from the casing and the support ring; a conductive distributing ring disposed around the nozzle adjacent to the support ring and insulated from the support ring, the distributing ring being electrically connected to the spring; and a crown of rebent hot wires for fuel ignition disposed adjacent to the fuel nozzle, each hot wire having one end grounded to the support ring and one end insulated from the support ring and connected to the distributing ring.

* * * * *